United States Patent Office 3,045,021
Patented July 17, 1962

3,045,021
PREPARATION OF SUBSTITUTED
2-OXOBENZOQUINOLIZINES
Arnold Brossi, Riehen, Switzerland, assignor to Hoffmann-La Roche Inc., Roche Park, Nutley, N.J., a corporation of New Jersey
No Drawing. Filed Sept. 13, 1960, Ser. No. 55,718
Claims priority, application Switzerland Sept. 24, 1959
7 Claims. (Cl. 260—289)

The present invention concerns a process for the preparation of substituted 2-oxobenzoquinolizines of the formula (I)
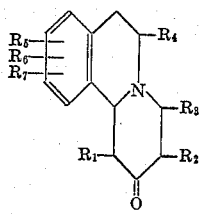

wherein each of the symbols $R_1$, $R_2$, $R_3$ and $R_4$ represents hydrogen or a lower alkyl group, such as methyl, ethyl, isobutyl or the like; and each of the symbols $R_5$, $R_6$ and $R_7$ represents hydrogen or a lower alkoxy group, such as methoxy, ethoxy, isobutoxy and the like; and $R_5$ and $R_6$ taken together represent lower alkylenedioxy, such as methylenedioxy. According to the invention, compounds of the Formula I above can be made by reacting a 3,4-dihydroisoquinoline of the formula (II)
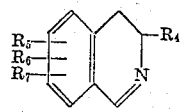

with a substituted alkyl vinyl ketone of the formula (III)
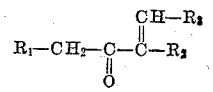

wherein the symbols $R_1$ to $R_7$, inclusive, have the same significance in Formulas II and III as indicated above for Formula I.

The substituted 3,4-dihydroisoquinolines of Formula II comprise a known group of materials and can be made according to known procedures. Such a procedure, for example, is that which comprises converting a correspondingly substituted β-phenylethylamine to its formamide and cyclizing the latter by the Bischler-Napieralski reaction (cf. R. C. Elderfield, Heterocyclic Compounds, volume IV, page 348, New York 1952; also J. M. Gulland and C. J. Virden, Journ. Chem. Soc. 1929, 1797). 6,7-di(lower alkoxy)-3,4-dihydroisoquinolines are preferred starting materials, especially 6,7-dimethoxy-3,4-dihydroisoquinoline; and also 6,7-methylenedioxy-3,4-dihydroisoquinoline.

The alkyl vinyl ketones of Formula III required for the processes of the invention likewise comprise a known group of compounds, which can be made according to known procedures. Such a procedure, for example, is that which comprises reacting a saturated ketone with an aldehyde, whereby a product of Formula III above is formed by splitting out water (H. Haeussler and J. Dijkema, Berichte 77, 601 [1944]). Another procedure, for example, comprises dehydrating carbinols, obtained by addition of acetylene compounds (the latter can be substituted by lower alkyl) to ketones, and adding one mol of water to the triple bond in the dehydration product formed (I. N. Nazarov et al., J. Gen. Chem., U.S.S.R. 26, 3117 [1956]). Preferred starting materials of Formula III are α-lower alkyl-methyl vinyl ketones, especially 3-methylene-5-methyl-2-hexanone and 3-methylene-2-pentanone.

The reactions of the invention are suitably effected in aqueous alkaline medium. Appropriate alkalies include alkali metal hydroxides, e.g. sodium hydroxide and potassium hydroxide, and alkali metal lower alkoxides, e.g. sodium methoxide and sodium ethoxide. The reaction is appropriately carried out in the presence of an inert water-miscible solvent, e.g. a lower alkanol, such as methanol or ethanol, or a cyclic ether, such as dioxan or tetrahydrofuran; thereby making possible the dissolution of the reactants.

A preferred mode of execution comprises shaking for several hours at room temperature the dihydroisoquinoline derivative (or a salt thereof) and the ketone, in dilute aqueous sodium hydroxide solution; if desired, with addition of methanol. In the absence of methanol, the reaction product precipitates directly. In the other case, the organic solvent must first be removed. The purification of the end product is effected by methods known per se, e.g. by crystallization, distillation or chromatography on aluminum oxide.

The products of Formula I, some of which are new compounds, are crystalline and little soluble in water. However, they form water-soluble salts with the usual inorganic and organic acids, e.g. with hydrochloric, sulfuric, phosphoric, tartaric, acetic and citric acids. Both the bases and their salts exhibit hypotensive, sedative, analgesic and antipyretic activity, and accordingly can be used as medicinal agents; they are also useful as intermediates in the synthesis of medicinal agents.

The invention is further disclosed in the following examples, which are illustrative but not limitative thereof. Temperatures are stated in degrees C.

Example 1

5.7 g. of 6,7-dimethoxy-3,4-dihydroisoquinoline hydrochloride is dissolved in 10 ml. of water and to the solution is added 2 g. of freshly distilled methyl vinyl ketone. Then 8 ml. of 3 N sodium hydroxide solution is added. After the mixture has remained standing for two hours, the semicrystalline product is filtered off and recrystallized twice from methanol/water. There is thus obtained 2-oxo-9,10-dimethoxy - 1,2,3,4,6,7 - hexahydro - 11bH-benzo[a]quinolizine of M.P. 150–151°. The oxime, after recrystallization from alcohol-water, melts at 185–186°.

Example 2

8 g. of 6,7-dimethoxy-3,4-dihydroisoquinoline is dissolved in 300 ml. of water. Then the solution is mixed with 10 ml. of 3 N sodium hydroxide solution and 10 g. of freshly distilled 3-penten-2-one is added. The mixture is shaken at room temperature for 12 hours and then is concentrated under a water pump vacuum. Ether is added, the ethereal solution is mixed with hydrochloric acid, the acidic aqueous phase is made alkaline, and the basic portions thereof are extracted with ether. After evaporation of the ether, the residue is chromatographed on aluminum oxide with petroleum ether/benzene (1:1). The eluate is concentrated and the residue is recrystallized from isopropyl ether/petroleum ether. There is thus obtained 2-oxo-4-methyl-9,10-dimethoxy-1,2,3,4,6,7-hexahydro-11bH-benzo[a]quinolizine of M.P. 103–104°. The oxime melts at 170°.

Example 3

3.8 g. of 6,7-dimethoxy-3,4-dihydroisoquinoline is dissolved in 100 ml. of water, 3 g. of 3-methylene-5-methyl-2-hexanone (B.P. 49–50°/15 mm.; $n_D^{21}=1.4292$; semicarbazone melting at 161–162°) is added, 5 ml. of 3 N sodium hydroxide solution is added, and sufficient methanol is added to produce a clear solution. The mixture is thereupon shaken for 48 hours at room temperature. Then it is concentrated under a water pump vacuum and the thus obtained concentrate is worked up as described in Example 2 to obtain therefrom the ether-soluble basic constituents thereof. The later are dissolved in acetone, mixed with alcoholic hydrochloric acid and then with ether until cloudiness sets in. Thereupon 2-oxo-3-isobutyl-9,10 - dimethoxy - 1,2,3,4,6,7-hexahydro-11bH-benzo[a] quinolizine hydrochloride crystallizes out (M.P. 208–210°). The oxime prepared therefrom melts, after recrystallization from alcohol/ether, at 155–156°.

*Example 4*

3.8 g. of 6,7-dimethoxy-3,4-dihydroisoquinoline and 2.5 g. of 3-methylene-2-pentanone (B.P. 110–115°/740 mm.; $n_D^{21}$=1.4292; semicarbazone: M.P. 164; 2,4-dinitrophenylhydrazone: M.P. 174–175°) are suspended in water and 5 ml. of 3 N sodium hydroxide solution is added. Then methanol is added until a clear solution results. The mixture is shaken for 12 hours at room temperature and is worked up according to indications in Example 3. The product obtained, 2-oxo-3-ethyl-9,10-dimethoxy-1,2,3,4,6,7 - hexahydro-11bH-benzo[a]quinolizine hydrochloride melts at 198–200°. The oxime, after recrystallization from alcohol/water, melts at 176–178°.

By reacting 3-methylene-2-pentanone and 6,7-methylenedioxy-3,4-dihydroisoquinoline according to the indications given above, there is obtained 2-oxo-3-ethyl-9,10-methylenedioxy - 1,2,3,4,6,7 - hexahydro-11bH-benzo[a] quinolizine of M.P. 148–149° (M.P. of the hydrochloride, 189°). The starting material, 6,7-methylenedioxy-3,4-dihydroisoquinoline, is obtained from homopiperonylamine, via its formamido derivative and cyclization according to Bischler-Napieralski; M.P. 89°.

*Example 5*

4.8 g. of 6-methoxy-3,4-dihydroisoquinoline and 4.5 g. of 3-methylene-5-methyl-2-hexanone are suspended in 150 ml. of water, 5 ml. of 3 N sodium hydroxide solution and 100 ml. of methanol are added, and the mixture is shaken for 24 hours at room temperature. Then the reaction mixture is concentrated under a water pump vacuum, the concentrate is taken up in ether and the basic portions thereof are extracted with dilute hydrochloric acid. The hydrochloric acid extract is made alkaline and the bases which are liberated are taken up in ether. After evaporation of the solvent, the remainder is distilled in high vacuum. As a forerun there is obtained 3 g. of basic starting material of B.P. 90–95°/0.07 mm. The distillation residue is dissolved in benzene/petroleum ether (1:1) and chromatographed on aluminum oxide. By concentration of the eluate there is obtained 2-oxo-3-isobutyl-9-methoxy - 1,2,3,4,6,7 - hexahydro-11bH-benzo[a]quinolizine, which upon addition of oxalic acid in acetone crystallizes as the oxalate, M.P. 154–155°. The oxime, after recrystallization from alcohol/water, melts at 144–145°.

According to the above indications, there is obtained from 6,7-methylenedioxy-3,4-dihydroisoquinoline and 3-methylene-5-methyl-2-hexanone, the product 2-oxo-3- isobutyl - 9,10-methylenedioxy-1,2,3,4,6,7-hexahydro-11bH-benzo[a]quinolizine of M.P. 110° (methanesulfonate: M.P. 210°).

*Example 6*

4.6 g. of 3-methyl-6,7-dimethoxy-3,4-dihydroisoquinoline (B.P. 115–120°/0.07 mm., M.P. of the hydrochloride 190°; the base being obtained from 3,4-dimethoxyphenylisopropylamine via the formamido derivative and cyclization according to Bischler-Napieralski) and 4 g. of 3-methylene-5-methyl-2-hexanone are suspended in 30 ml. of water. To this suspension is added 5 ml. of 3 N sodium hydroxide solution and then sufficient methanol to produce a clear solution. The reaction mixture is shaken for 48 hours at room temperature. Thereupon it is concentrated under a water pump vacuum, the residue is taken up in ether and the ethereal solution is extracted with 3 N hydrochloric acid. The hydrochloric acid extract is made alkaline and the basic materials thus liberated are taken up in ether. The ethereal extract is dried and concentrated and the residue obtained is dissolved in a mixture of benzene/petroleum ether (1:1) and chromatographed on a column of 90 g. of aluminum oxide. After evaporating the solvent from the eluate, the remainder is mixed with acetone and a solution of anhydrous oxalic acid in acetone is added. There is thus obtained 2-oxo-3 - isobutyl-6-methyl-9,10-dimethoxy-1,2,3,4,6,7-hexahydro-11bH-benzo[a]quinolizine oxalate; after recrystallization from alcohol/ether, this product melts at 134–136°.

I claim:

1. A process for making a compound of the formula

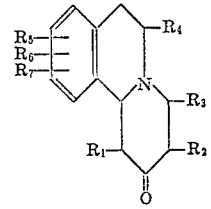

wherein $R_1$, $R_2$, $R_3$ and $R_4$ are selected from the group consisting of hydrogen and lower alkyl, and $R_5$, $R_6$ and $R_7$ are selected from the group consisting of hydrogen and lower alkoxy and lower alkylenedioxy represented by $R_5$ and $R_6$ taken together, which comprises condensing in alkaline medium a compound of the formula

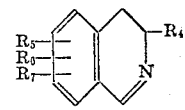

wherein $R_4$, $R_5$, $R_6$ and $R_7$ have the same meaning indicated above, with a compound of the formula

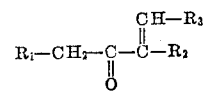

wherein $R_1$, $R_2$ and $R_3$ have the same meaning indicated above.

2. A process according to claim 1 wherein the condensation is effected in aqueous alkaline medium.

3. A process for the preparation of 2-oxo-9,10-dimethoxy-1,2,3,4,6,7 - hexahydro ₋ 11bH - benzo[a]quinolizine which comprises condensing in alkaline medium 6,7-dimethoxy-3,4-dihydroisoquinoline with methyl vinyl ketone.

4. A process for the preparation of 2-oxo-3-isobutyl-9,10-dimethoxy-1,2,3,4,6,7-hexahydro - 11bH - benzo[a] quinolizine which comprises condensing in alkaline medium 6,7-dimethoxy-3,4-dihydroisoquinoline with 3-methylene-5-methyl-2-hexanone.

5. A process for the preparation of 2-oxo-3-ethyl-9,10-dimethoxy - 1,2,3,4,6,7 - hexahydro - 11bH - benzo [a] quinolizine which comprises condensing in alkaline medium 6,7-dimethoxy-3,4-dihydroisoquinoline with 3-methylene-2-pentanone.

6. A process for the preparation of 2-oxo-3-ethyl-9,10-methylenedioxy - 1,2,3,4,6,7 - hexahydro - 11bH ₋ benzo [a]quinolizine which comprises condensing in alkaline medium 6,7-methylenedioxy-3,4-dihydroisoquinoline with 3-methylene-2-pentanone.

7. A process for the preparation of 2-oxo-3-isobutyl-9,10 - methylenedioxy - 1,2,3,4,6,7 - hexahydro - 11bH-benzo[a]quinolizine which comprises condensing in alkaline medium 6,7-methylenedioxy-3,4-dihydroisoquinoline with 3-methylene-5-methyl-2-hexanone.

No references cited.